United States Patent [19]
Schlatter

[11] 3,832,884
[45] Sept. 3, 1974

[54] DENSITOMETER

[75] Inventor: Gerald Lance Schlatter, Boulder, Colo.

[73] Assignee: International Telephone and Telegraph Corporation, New York, N.Y.

[22] Filed: July 10, 1972

[21] Appl. No.: 270,335

[52] U.S. Cl. .................................................. 73/32
[51] Int. Cl. ............................................. G01n 9/00
[58] Field of Search ........... 73/32, 32 A, 67.1, 67.2, 73/67.3, 67.4, 59, 194 B; 330/60; 331/157

[56] References Cited
UNITED STATES PATENTS

| | | | |
|---|---|---|---|
| 3,117,440 | 1/1964 | Wilner | 73/32 |
| 3,444,723 | 5/1969 | Wakefield | 73/32 |
| 3,706,026 | 12/1972 | Johnson et al. | 73/67.2 X |
| 3,715,912 | 2/1973 | Schlatter | 73/32 |

Primary Examiner—Jerry W. Myracle
Assistant Examiner—John P. Beauchamp
Attorney, Agent, or Firm—A. Donald Stolzy

[57] ABSTRACT

A densitometer which utilizes a thin vane vibrated by a magnetostrictive tube. A piezoelectric crystal pickup feeds an amplifier and tracking filter to energize a driver coil around the magnetostrictive tube. The device is, in effect, an electromechanical oscillator in that the coil is driven in phase with the detected signal. Vibration thus increases in amplitude until limited electrically. A linearization circuit provides an output D.C. voltage directly proportional to fluid density, gas or liquid, which may be impressed upon a conventional D.C. voltmeter calibrated linearly in density. A great many features, both in the mechanical structure and in the electronics, make it possible to easily calibrate the instrument to read, for example, to within an accuracy tolerance of ±0.1 percent over a fluid density range of, for example, from about 0.08 pounds per cubic foot to 80.0 pounds per cubic foot. Another outstanding advantage of the invention relates to a probe-type construction which may be used in a pipeline of any size. Still another feature of the invention resides in the use of a divide-by-two divider to reconcile the driver frequency to the crystal frequency.

2 Claims, 11 Drawing Figures

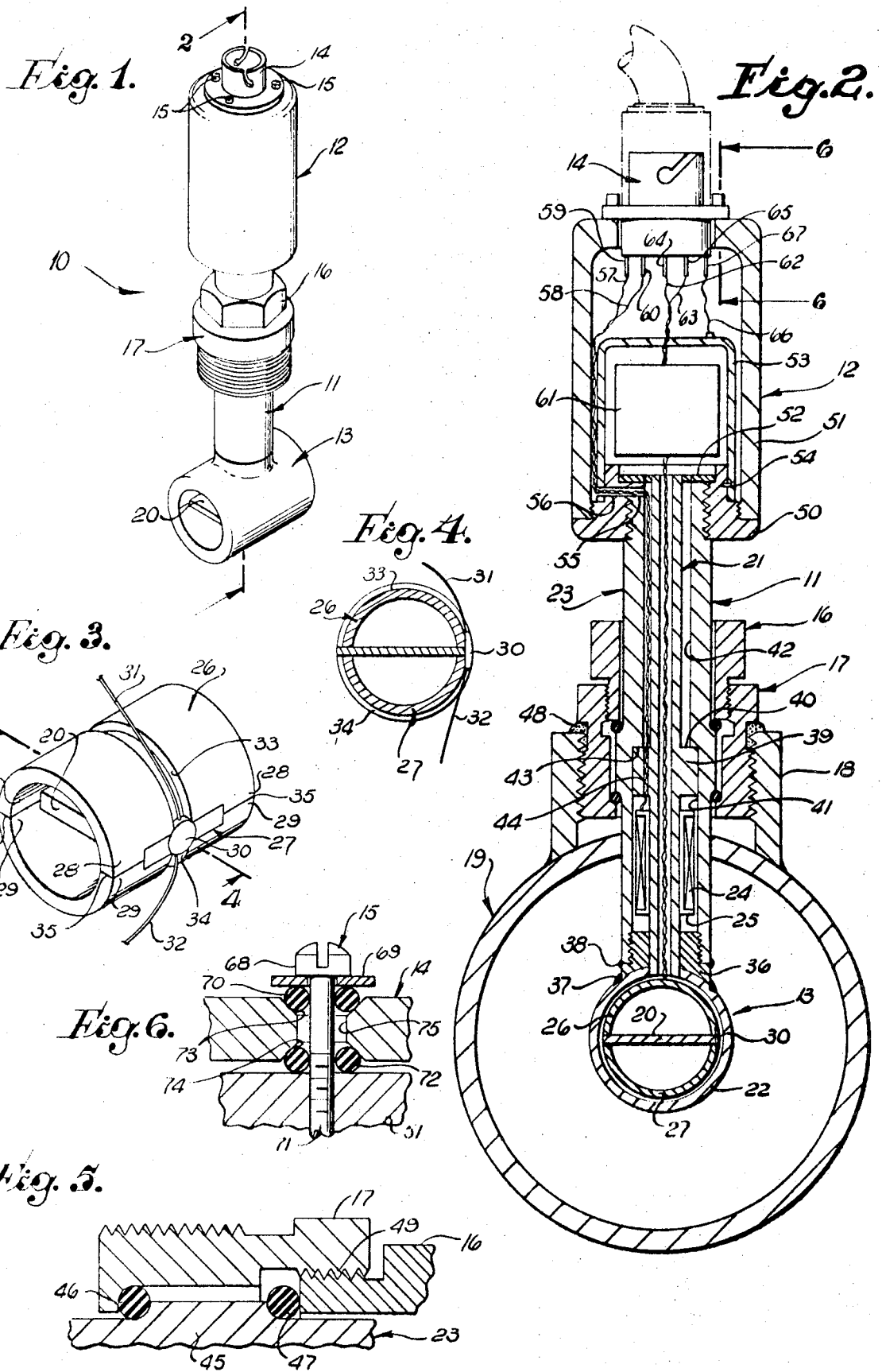

3,832,884

DENSITOMETER

BACKGROUND OF THE INVENTION

This invention relates to instruments for producing output signals as a function of the density of a fluid, and more particularly, to a vibration densitometer.

In the prior art, see copending application Ser. No. 65,371 filed Aug. 20, 1970, now U.S. Pat. No. 3,677,067, by C. E. Miller and G. L. Schlatter for DENSITOMETER. In such prior art, a D.C. bias is provided for a magnetostrictive drive that drives a vibratable vane. In some cases, elimination of the bias can become desirable.

SUMMARY OF THE INVENTION

In accordance with the device of the present invention, the above-described and other disadvantages of the prior art are overcome by providing a vibration densitometer utilizing a divide-by-two divider in the electronic feedback path to eliminate the need for the magnetostrictive driver D.C. bias.

For purpose of definition herein and in the claims, the phrase "first resonant frequency" hereby is defined to mean the lowest frequency at which the said electromagnetic oscillator will oscillate. Note will be taken that depending upon the location and band width of the tracking filter passband, the said electromagnetic oscillator may oscillate at any one of several resonant frequencies. It is also to be pointed out that whichever resonant frequency is selected, the resonant frequency changes with density and it is this charge in resonant frequency that produces an indication of the density of a fluid.

As will be explained, the lowest resonant frequency is preferred because, in general, the largest signal-to-noise ratio may be obtained for this condition.

The word "densitometer" is hereby defined for use herein and in the claims to include an instrument without, as well as with, a density or other indicator. For example, the device of the present invention can produce an output signal which is a D.C. voltage directly proportional to density. Thus, if the invention were combined into a mass rate of flow meter, the indicator would indicate the mass rate of flow, and not density. It would thus be unnecessary to have an indicator to indicate density. The said D.C. analog voltage would then only be used in a multiplier to derive a signal directly proportional to, for example, the produce of the density and total volume flow or flow rate analogs. The output signal magnitude would then be directly proportional to total mass flow or mass rate of flow. The magnitude of a mass rate of flow analog could be displayed on an indicator. Alternatively, a total mass flow indicator could be used by integrating the multiplier output. A density or mass rate of flow or other analog could be used in controlling a process. In this case, no indicator whatsoever would be needed.

The word "differentiator," as used herein, includes an amplifier. This differentiator is entirely conventional, but is not identical to other conventional differentiators of the prior art. Thus, the word "differentiator" is defined for use herein and in the claims to include the differentiator shown in the drawings and described herein and any equivalent thereof.

From the foregoing, it will be appreciated that the densitometer of the present invention may be used in a pipe or another container of a fluid tight construction. However, the pipe or other container need not be fluid tight. A simple fluid receptacle will do as well. Thus, the probe of the invention may simply be submerged in a fluid. Further, it is a feature of the invention that the probe may be inserted either into a gas or a liquid, or both in succession, and the density of the gas or the density of the liquid or the densities of both may be determined even without a change in calibration.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a perspective view of a densitometer probe constructed in accordance with the present invention;

FIG. 2 is a sectional view of the probe taken on the line 2—2, shown in FIG. 1;

FIG. 3 is a perspective view of a group of component parts of the probe shown in FIG. 1;

FIG. 4 is a transverse sectional view of the assembly taken on the line 4—4, shown in FIG. 3;

FIG. 5 is an enlarged longitudinal sectional view of a portion of the probe shown in FIG. 1;

FIG. 6 is a longitudinal sectional view of a portion of mounting means for an electrical connector otherwise substantially fixed relative to the probe taken on the line 6—6, shown in FIG. 2;

DESCRIPTION OF THE PREFERRED EMBODIMENT

Figure 7:
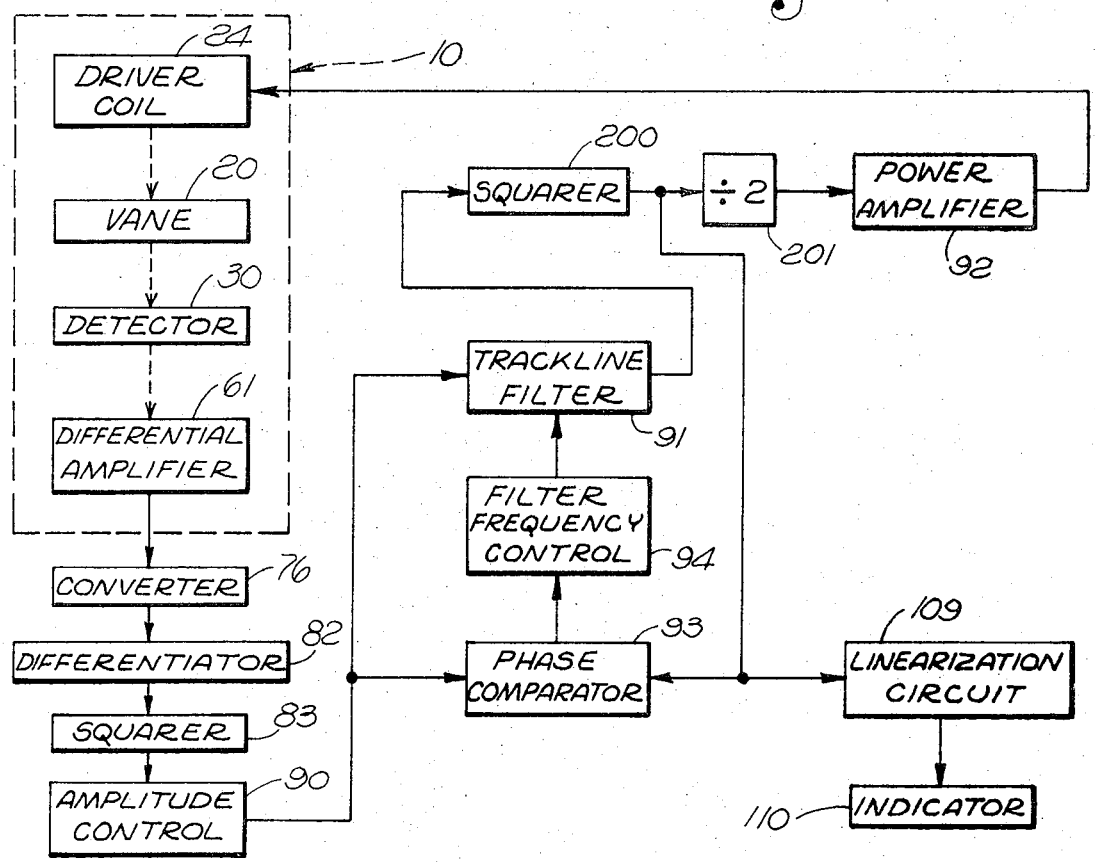
FIG. 7 is a block diagram of a densitometer constructed in accordance with the present invention.

In FIG. 1, the probe of the present invention is indicated at 10 having a shank 11, a housing 12 at its upper end, a tubular assembly 13 at its lower end, and an electrical connector assembly 14 at the upper end of housing 12 fixed thereto by bolts 15. Annular fittings 16 and 17 extend around shank 11 for mounting probe 10 in a hollow cylindrical extension 18 of a pipeline 19, as shown in FIG. 2.

As shown in FIGS. 1 and 2, a stainless steel vane 20 is mounted in assembly 13 in a position perpendicular to the axis of the hollow cylindrical magnetostrictive inner tube 21. Vane 20, if desired, may be also mounted in a symmetrical position with respect to the axis of an outer sleeve 22 which houses it.

Vane 20 may be a rectangular plate having flat and parallel upper and lower surfaces as shown in FIG. 2, and may otherwise have mutually normal surfaces forming a right parallelopiped.

Shank 11 not only includes inner tube 21, but an outer magnetic tube 23. A driver coil or solenoid winding 24 wound on a nylon bobbin 25 is press fit onto the external surface of inner tube 21 and located in a space between the tubes 21 and 23 toward the lower end of shank 11. Coil 24 is thus maintained in a substantially fixed position on inner tube 21, although the same is not necessarily critical to the operation of the device of the present invention.

Vane 20 is supported between two half cylinders 26 and 27, as shown in FIGS. 2 and 3. According to the invention, the longitudinal edges of vane 20 are pressed together between half cylinders 26 and 27 with a pressure of, for example, 20,000 pounds per square inch because the assembly shown in FIG. 3 is inserted in sleeve 22 with an interference fit, sleeve 22 being heated prior to the said insertion.

Half cylinder 26 has four projections 28, and half cylinder 27 has four projections 29. Projections 28 and 29 serve to prevent longitudinal movement of vane 20 between half cylinder 26 and half cylinder 27 although the same is not likely due to the clamping pressure on vane 20 between half cylinder 26 and half cylinder 27.

Half cylinders 26 and 27, and vane 20, may be machined to have a flat or recess to receive a piezoelectric crystal 30. Crystal 30 has electrical leads 31 and 32 which extend around half cylinders 26 and 27 in grooves 33 and 34, respectively, to a point where they enter the hollow interior of inner tube 21. This entry is made at the lower end of inner tube 21, as shown in FIG. 2.

As shown in FIG. 3, projections 28 and 29 may have a slight separation at 35 to insure that the pressure contact of half cylinders 26 and 27 on vane 20 is quite high due to the said interference fit.

As shown in FIG. 2, a boss is welded at 37 to sleeve 13 in a fluid tight manner. Although the device of the present invention need not always be fluid tight throughout, a glass-to-metal seal or other seal may be provided inside inner tube 21 for leads 31 and 32. Before the said interference fit is provided, if desired, crystals 30, and those portions of leads 31 and 32 in grooves 33 and 34, respectively, may be potted with an epoxy. Further, after the interference fit has been effected, the entire unit when completely assembled may be treated further by applying a bonding agent around all of the structures inside sleeve 22. Any conventional bonding process may be employed including, but not limited to, the application of a bonding agent sold under the name of "Locktite."

As stated previously, boss 36 may be welded to sleeve 22 at 37 in a fluid tight manner. Further, outer tube 23 may be threaded onto boss 36 and welded thereto at 38 in a fluid tight manner. For all practical purposes, boss 36 may thus be considered an integral part of outer tube 23. Boss 36, for example, is also made of a magnetic material. All of the "magnetic materials" referred to herein may be any magnetic material including, but not limited to, stainless steel. However, inner tube 21, although being magnetic, must also be magnetostrictive. Notwithstanding this limitation, it is to be noted that inner tube 21 is employed to produce vibration, and if one feature of the present invention is used without another, the use of a magnetostrictive or magnetic material may not be required, and the invention still practiced.

Inner tube 21 has an annular projection 39 with a shoulder 40. Outer tube 23 has a lower bore 41 separated from a smaller upper counter bore 42 by an annular shoulder 43. Shoulder 40 and 43 abut. From shoulder 40 to the lower end of inner tube 21, inner tube 21 is always in axial compression. That is, inner tube 21 is in compression when coil 24 is energized, but inner tube 21 is also in compression when coil 24 is deenergized. Coil 24 is energized with an alternating current which thus merely changes the degree of compression of inner tube 21.

Projection 39 has a hole 44 through which the electrical leads of coil 24 can pass from the location of coil 24 upwardly between tubes 21 and 23.

The manner in which probe 10 is mounted in pipeline 19 is better illustrated in FIG. 5. In FIG. 5, note will be taken that outer tube 23 has an outwardly extending radial projection 45 on each side of which rubber O-rings 46 and 47 are compressed by fittings 16 and 17. Fitting 17 is threaded into extension 18 and sealed thereto by a conventional sealing compound 48 shown in FIG. 2. In FIG. 5, note will be taken that fitting 16 is threaded inside fitting 17 at 49. The amount O-rings 46 and 47 are compressed is, therefore, determined by the position of fitting 16. That is, fitting 16 is turned, for example, by a wrench, until the desired O-ring compression is reached.

From the construction illustrated in FIG. 5, note will be taken that only O-rings 46 and 47 contact outer tube 23, and that, therefore, shank 11 is never touched by either fitting 16 or fitting 17.

It is an advantage of the present invention that the construction of probe 10 is such that the leads from coil 24 are kept magnetically separate from the leads from crystal 30. This is true through a portion of housing 12, as will be described. Ideally, the entire circuit of FIG. 7 should be shielded. However, in FIG. 2, housing 12 has a fitting 50 threaded onto outer tube 23. A cylinder 51 is threaded to fitting 50. A washer 52 is press fit and thereby fixed in fitting 50 and inner tube 21. Inner tube 21 has an upper end which may be fixed relative to or slidable in washer 52, as desired. However, preferably the external surface of inner tube 21 at its upper end fits contiguous or in contact with the surface of washer 52 defining the hole therethrough. A shield 53 made of a magnetic material may be fixed around fitting 50 by one or two or more screws 54. Outer tube 23 has a radial hole 55 therethrough through which the leads from coil 24 pass. Fitting 50 has a hole 56 therethrough in alignment with hole 55 through which the leads from coil 24 pass. From the outward radial extremity of hole 56, the coil leads indicated at 57 and 58 pass upwardly between cylinders 51 and shield 53 and are connected to pins 59 and 60 of the electrical connector 14. Electrical connector 14 may be a conventional five pin connector.

As stated previously, the leads 31 and 32 from crystal 30 extend upwardly through the interior of inner tube 21. At the upper end of inner tube 21, as shown in FIG. 2, leads 31 and 32 are connected to the input of differential amplifier 61. Leads 31 and 32 thus extend outwardly through the upper opening in inner tube 21.

Differential amplifier 61 may be entirely conventional, and mounted on a conventional card, if desired. Amplifier 61 may be supported inside shield 53 by any conventional means, if desired, or simply supported by the strength of leads 31 and 32, and output leads 62 and 63 which are connected to pins 64 and 65 of connector 14, respectively. A lead 66 provides a ground connection from shield 53 to the fifth pin 67 of connector 14.

The manner in which connector 14 is mounted on cylinder 51 is shown in FIG. 6. Only one bolt 15 is shown in FIG. 6 since all bolts 15 are similarly situated. In FIG. 6, bolt 15 is shown having a head 68, a washer 69 under head 68, on O-ring 70 under washer 69 and a shank 71 threaded into cylinder 51. A second O-ring 72 also extends around screw shank 71. O-ring 70 fits between the lower surface of washer 69 and a counter sunk frusto-conical hole 73 in connector 14. O-ring 72 fits between the upper surface of cylinder 51 and another counter sunk frusto-conical hole 74 in connector 14. Holes 73 and 74 are connected by a bore 75. From FIG. 6, it will be noted that all the structures shown therein may vibrate, but that the amount of vibration transmitted to connector 14 may be quite small.

One embodiment of the densitometer of the present invention is illustrated in FIG. 7. Probe 10 is again so indicated as housing driver coil 24, crystal 30 and differential amplifier 61. Crystal 30 is labeled "detector" in FIG. 7.

Figure 8:
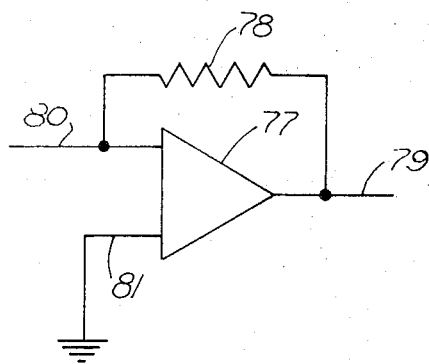
FIG. 8 is a schematic diagram of a current-to-voltage converter shown in FIG. 7.

A current-to-voltage converter 76 is connected from amplifier 61. Converter 76 is shown in FIG. 8, and may be entirely conventional. In FIG. 8, an amplifier is indicated at 77 having a feedback resistor 78 connected from its output at 79 to its input at 80, amplifier 77 having a ground connection at 81.

In FIG. 7, a differentiator 82 is connected from converter 76 to a squarer 83. Differentiator 82 may likewise be entirely conventional, as shown in FIG. 9.

Figure 9:
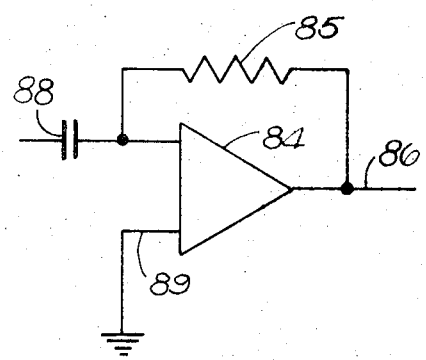
FIG. 9 is a schematic diagram of a differentiator shown in FIG. 7.

In FIG. 9, an amplifier 84 has a feedback resistor 85 connected from an output 86 to an input 87. The input to differentiator 82 is then supplied through a capacitor 88 connected to the amplifier input 87. Amplifier 84 is also supplied with a ground connection 89.

The input to differentiator 82 is mainly a sine wave voltage having a frequency which is equal to the resonant frequency detected by crystal 30. As is conventional, differentiator 82 then produces a sine wave voltage shifted in phase by 90 degrees from the input sine wave voltage and proportional in amplitude to the absolute value of the input frequency. The output sine wave voltage of the differentiator 82 is then converted to a square wave by squarer 83. Since the units of time are not equal to the units of potential, the phrase "square wave" is, therefore, defined for use herein and in the claims to mean a voltage wave which abruptly arises to a maximum value and stays constant over half the period thereof, and then abruptly drops, for example, with an almost infinite slope again to its minimum value. The square wave then remains at its minimum value for half of its period. Thus, a square wave may have any maximum amplitude and any minimum amplitude without regard to its period or frequency.

An amplitude control 90, a tracking filter 91, a squarer 200, a divide-by-two divider 201 and a power amplifier 92 are successively connected in that order from squarer 83 to driver coil 24. A phase comparator 93 receives one input from the output of control 90, another input from the output of squarer 200, and supplies an input to a filter frequency control 94. The output of the control 94 is employed to vary electrically the frequency location of the passband of filter 91 to center on the signal having one fundamental frequency of the square wave output of control 90. This signal then passes through filter 91 with the least attenuation.

Amplitude control 90 may simply be a voltage divider to reduce the amplitude of the output signal of squarer 83 to a desired value. Note that if all of the blocks of the system of FIG. 7, previously described, operate as an electromechanical oscillator, the oscillation amplitude may increase to infinity at which or before which some of the component parts may fail. Thus, to put a finite limit on the amount of feedback to driver coil 24, control 90 is provided.

Figure 10:
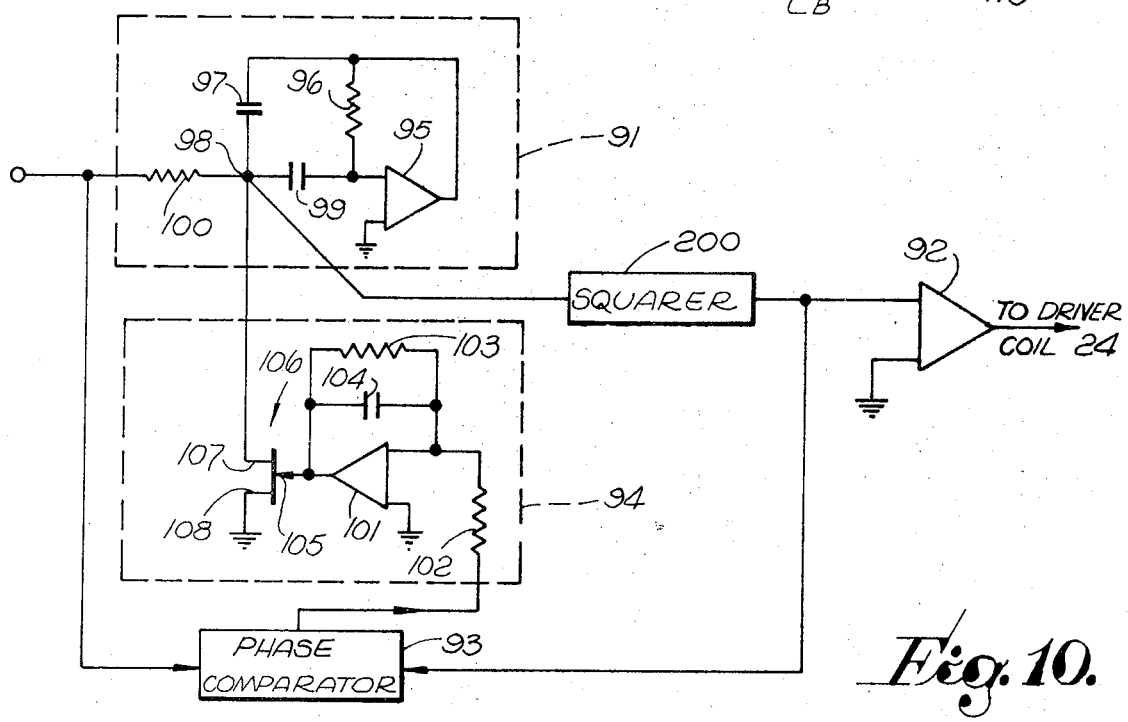
FIG. 10 is a schematic diagram of the blocks shown in FIG. 7, two other of the blocks also being shown in relation thereto.

Phase comparator 93 is entirely conventional. Control 94 and filter 91 are shown in FIG. 10. Filter 91 includes an amplifier 95, a resistor 96 connected from the output to the input of amplifier 95, a capacitor 97 connected from junction 98 to the output of the amplifier 95, a capacitor 99 connected from the junction 98 to the input of amplifier 95 and a resistor 100 connected from the output of control 90 to junction 98.

Control 94 includes an amplifier 101 connected from the ouptut of phase comparator 93 through a resistor 102. A resistor 103 is connected from the output to the input of amplifier 101. Similarly, a capacitor 104 is connected from the output to the input of amplifier 101. The output of amplifier 101 is connected to the gate 105 of a field effect transistor 106. The drain 107 of transistor 106 is connected to junction 98. The source 108 of transistor 106 is connected to ground.

The output of filter 91 is taken at junction 98 and applied both to amplifier 92 and comparator 93 through squarer 200.

Figure 11:
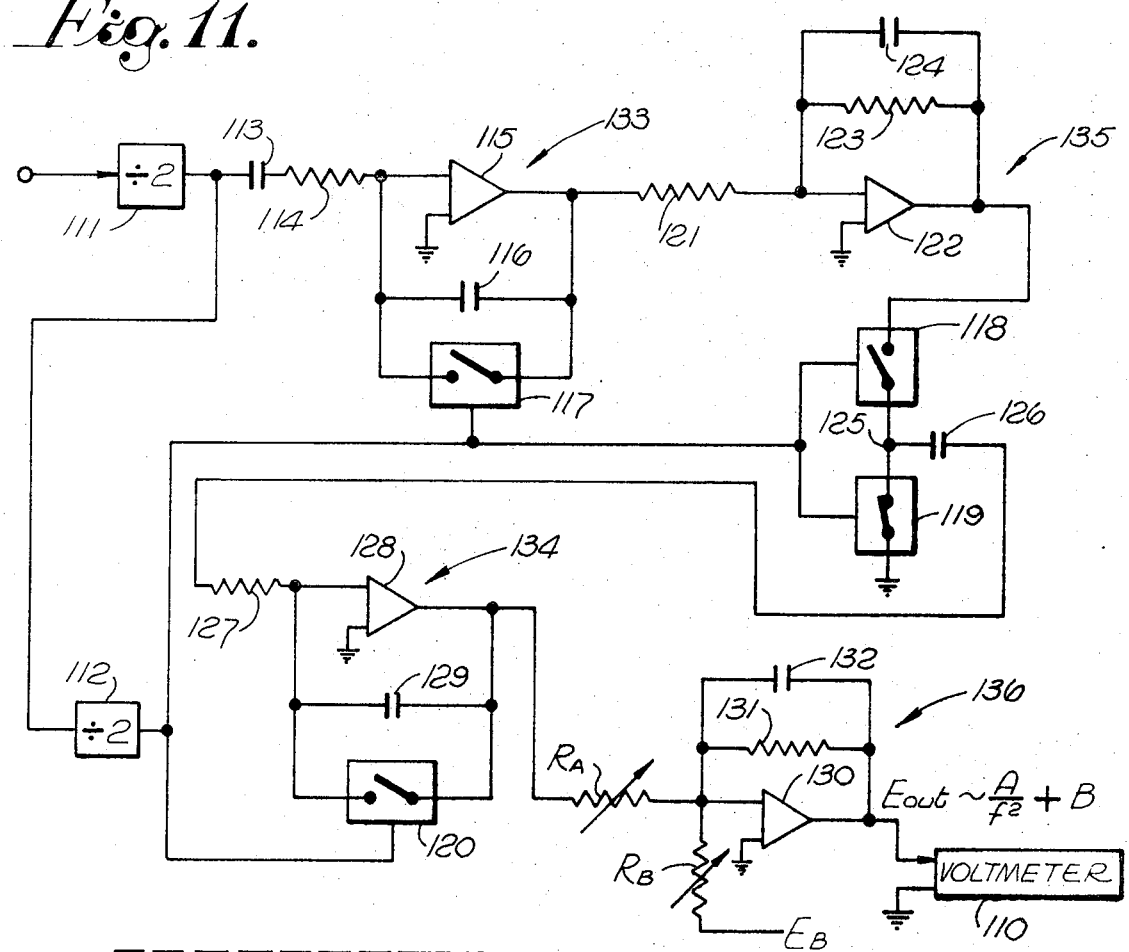
FIG. 11 is a schematic diagram of a linearization circuit shown in FIG. 7.

In FIG. 7, the output of filter 91 is impressed upon a linearization circuit 109 through squarer 200. The output of circuit 109 is impressed upon an indicator 110, which may be a voltmeter, as shown in FIG. 11. Voltmeter 110 may be a D.C. voltmeter linearly calibrated in density, if desired.

If desired, so that phase comparator 93 may receive a stronger input signal, the output of squarer 83 may be connected directly to comparator 93, and the input thereto from the output of amplitude control 90 may be omitted. Similarly, a connection between the output of filter 91 and the input of comparator 93 may be made, and the connection of the output of squarer 200 to comparator 93 omitted.

Linearization circuit 109 is shown in greater detail in FIG. 11 including divide-ty-two circuits 111 and 112, both of which may be identical. Each divide-by-two circuit or divider disclosed herein may be entirely conventional. For example, divide-by-two circuit 111 may be simply a binary digital counter adapted for automatic reset on a predetermined count. The output of this counter would then be taken from the last stage thereof.

In general, circuit 111 will produce a square wave output from a positive maximum to ground. The square wave would thus never drop below ground. A relatively large capacitor 113 centers the square wave about ground so that the square wave reaches an approximately maximum value of $+E_1$ and a minimum value of $-E_1$. If the frequency of the input signal of circuit 111 is $f_o$, the frequency of the output signal of circuit 111 is $f$. Thus, $f_o = K_o f$, $K_o$ may be any number larger than zero. However, in the specific case of circuit 111, $K_o = 2$.

A resistor 114 is connected from capacitor 113 to the input of an amplifier 115. A capacitor 116 is connected from the output to the input of amplifier 115. The same is true of a switch 117. Switches are also provided at 118, 119 and 120. All of the switches 117, 118, 119 and 120 are preferably electrical switches and thus, for example, incorporate transistors. Switches 117, 118, 119 and 120 are entirely conventional. Switches 117, 118, 119 and 120 are closed for alternate groups of periods. All the periods of one group are equal in time. All the periods in the other group are likewise equal in time. Further, each period of one group is equal to the common period of the other group. Switches 117, 118, 119 and 120 are operated synchronously. That is, all change position at the same time. However, switch 117 may be open or closed when any of the other switches 118, 119 and 120 are open or closed. The same is true of switch 120. Switch 118 may be open or closed regardless of the open or closed states of switches 117 and 120. However, switch 118 must be open when switch 119 is closed, and vice versa. The same is true of switch 119.

A resistor 121 connects the output of amplifier 115 to an amplifier 122. A resistor 123 is connected from the output of amplifier 122 to the input thereof. The same is true of a resistor 124. Switches 118 and 119 are connected to the output of amplifier 122 to ground. Switches 118 and 119 are connected by a mutual junction 125. A capacitor 126, which performs the same function as capacitor 113 and is also relatively large, is connected from junction 125. A resistor 127 is connected from capacitor 126 to the input of an amplifier 128. A capacitor 129 is connected from the output to the input of amplifier 128. The same is true of switch 120.

The output of amplifier 128 is connected to the input of amplifier 130 by a variable resistor $R_A$. A variable resistor $R_B$ is connected from a source of potential $E_B$ to the input of amplifier 130. A resistor 131 is connected from the output of amplifier 130 to the input thereof. The same is true of a capacitor 132. The output of amplifier 130 is connected to the input of voltmeter 110. The output of amplifier 130 is a D.C. voltage directly proportional to $$A/f^2 + B$$

where A and B are constant. From the previous equation $f_o = K_o f$, it is also to be noted that by a mere change in constants, the output voltage of amplifier 130 is directly proportional to $$A_o/f_o^2 + B$$

where $A_o$ is also a constant.

As will be explained, the signal appearing at the left end of resistor 127, as viewed in FIG. 11, will be a square wave having a maximum amplitude of $+E_2$ and a minimum amplitude of $-E_2$.

In FIG. 10, control 94 may be entirely conventional except the transistor 106. Transistor 106, by itself, may be conventional, but not in the circuit combination or as used. Transistor 106 changes the resistance between junction 98 and ground in accordance with the output of comparator 93. All the structure of control 94, except transistor 106, is simply a D.C. amplifier and filter. Any conventional D.C. amplifier and filter may be substituted therefor.

Whether or not transistor 106 is considered in the circuit of control 94 or in the circuit of filter 91, the major function of the filter 91 is to provide a passband with a tracking control through the connection between transistor 106 and junction 98 via source 107.

Any conventional tracking filter and conventional control, therefore, may be substituted for filter 91 and control 94. Methods other than phase comparison may also be employed to provide an input to the tracking filter frequency control.

In FIG. 11, resistor 14, capacitor 116, and amplifier 115 form a conventional integrator. Any conventional integrator may be substituted therefor. The same is true of resistor 127, capacitor 129 and amplifier 128.

Resistor 121 with resistor 123, capacitor 124 and amplifier 122 form a conventional averaging circuit. The output of amplifier 122 will be a substantially constant D.C. voltage directly proportional to the average value of the voltage appearing at the output of amplifier 115. The same is true of resistor $R_A$, resistor 131, capacitor 132 and amplifier 130. The fact that resistor $R_A$ is variable provides an adjustment feature in accordance with the device of the present invention. The same is true of resistor $R_B$. That is, the output voltage of amplifier 130 will be directly proportional to the average of the output voltage of amplifier 128, as modified by any adjustments in resistors $R_A$ and $R_B$.

For reference, the said integrators are indicated at 133 and 134. The averaging circuits are indicated at 135 and 136.

The input of integrator 133 is a square wave centered about zero volts. The output of integrator 133 would then be a series of triangular waves. Circuit 122 shunts the output of amplifier 115 to its input alternate triangles. Thus, the triangles are spaced between signal values very close to zero volts. Circuit 135 then averages the triangles. Thus, the output of amplifier 122 is a substantially constant D.C. voltage directly proportional to the peak amplitudes of the triangles. Since the peak amplitudes are reached after an integration of a square wave, the peak amplitudes are thus directly proportional to period, and inversely proportional to frequency. Hence, the output of circuit 135 is directly proportional to the reciprocal of frequency. Circuit 112 operates switches 118 and 119 to convert the output of circuit 135 again to a square wave having a maximum amplitude equal to the output signal amplitude of circuit 135. This square wave is zero adjusted through capacitor 126 so that, as stated previously, the constant maximum is $+E_2$ and the constant minimum is $-E_2$. Integrator 134 then produces triangular wave, as before, and circuit 112 operating switch 120 cancels out alternate triangles. Averaging circuit 136 then produces an output which is again directly proportional to the triangle peaks. Since the triangle peaks are proportional to the product of $E_2$ and the triangle period, and $E_2$ is proportional to the triangle period, the output of circuit 136 is proportional to the period squared or inversely proportional to the frequency squared. Thus, the output of circuit 136 is proportional to $$A/f^2 + B$$

It is an outstanding feature of the device of the present invention that a formula may be developed which the output of amplifier 130 follows very closely. Calibration is thus made very easy. The development of this formula follows.

First, assume a container filled with a liquid and suspended from a fixed structure by a coiled spring. If the container is pulled downwardly, as is well known, the system will vibrate, i.e., move up and down in yo-yo fashion, at a frequency, $f$, given by $$f = (K/m)^{1/2} \tag{1}$$

where $K$ is the force constant of the spring, and m is the total mass of the system.

Squaring both sides of (1) and transposing $f^2$ and m $$m = K/f^2 \tag{2}$$

If $m_c$ is the mass of the container, and $m_f$ is the mass of the fluid, $$m = m_c + m_f \tag{3}$$

From (2) and (3), $$m_c + m_f = K/f^2 \tag{4}$$

Subtracting $m_c$ from both sides of (4), $$m_f = K/f^2 - m_c \tag{5}$$

By definition, mass is equal to the product of density and volume. If the fluid has a density, $d$, and a volume, $v$, from (5), $$dv = K/f^2 - m_c \tag{6}$$

Thus, $$d = (K/v)/f^2 - m_c/v \tag{7}$$

Since $K$, $m_c$ and $v$ are all constants, we can define constants, A and B, in (8) and (9), respectively, as follows:

$$A = K/v \tag{8}$$

$$B = -m_c/v \tag{9}$$

Combining (7), (8) and (9), $$d = A/f^2 + B \tag{10}$$

In accordance with the device of the present invention, it is striking that an output can be reduced from amplifier 130 that will be directly opposite to $d$ as defined in (10) within a very small accuracy tolerance of ±0.1 percent over a wide range from about 0.08 pounds per cubic foot to about 80.0 pounds per cubic foot. d then becomes the density of the liquid or gas under test, $f$ is one of the frequencies at which vane 20 resonates, preferably the lowest or first resonant frequency. As stated previously, A and B are constants.

The unique character of the invention which causes the output of amplifier 130 to follow $d$ makes it possible to calibrate the densitometer of FIG. 7 very easily, quickly and accurately.

The first step in calibration is to immerse probe 10 from entirely below fitting 17 in a first fluid of known density $d_a$, and measure the resonant frequency $f_a$. The second step is to immerse probe 10 entirely below fitting 17 in a second fluid of known density $d_b$, and measure the resonant frequency, $f_b$, where $d_b$ is not equal to $d_a$. That is, the second fluid should not be the same fluid as the first fluid.

After the said calibration steps have been performed, the desired constants, A and B, may then be calculated from the following simultaneous equations (11) and (12), i.e., two equations and two unknowns.

$$d_a = A/f_a^2 + B \tag{11}$$

$$d_b = A/f_b^2 + B \tag{12}$$

$$d_a - d_b = A(f_b^2 - f_a^2)/f_a^2 f_b^2 \tag{13}$$

$$A = f_a^2 f_b^2 (d_a - d_b)/f_b^2 - f_a^2 \tag{14}$$

$$B = d_a - A/f_a^2 \tag{15}$$

$$B = d_a - (1/f_a^2)(f_a^2 f_b^2 (d_a - d_b)/f_b^2 - f_a^2) \tag{16}$$

$$b = d_a(f_b^2 - f_a^2) - f_b^2 (d_a - d_b)/f_b^2 - f_a^2 \tag{17}$$

$$B = d_a f_b^2 - d_a f_a^2 - d_a f_b^2 + d_b f_b^2/x \tag{18}$$

$$B = d_b f_b^2 - d_a f_a^2/f_b^2 - f_a^2 \tag{19}$$

In accordance with the foregoing, the resistance of variable resistor $R_A$ may be changed by adjustment thereof until A is equal to the value given by (14) and resistor $R_B$ adjusted until B is equal to the value given by (19). Thus, $$E_{out} = C[A/f^2 + B] \tag{20}$$

where $E_{out}$ is the D.C. output voltage of amplifier 130, and C is a constant of proportionality.

Notice the bracket terms have density units, $M/L^3$, and $E_{out}$ has units of a difference of potential, $e$, where M = mass, and L = length. Thus, C has units $eL^3/M$. For example, C may be in units of volt cubic feet per pound.

Stated another way, $E_{out}$ is directly proportional to the bracketed terms of (20), and the constant of proportionality, C, is simply determined by whatever arbitrary voltage settings or amplifier gains that are selected for densitometer operation.

OPERATION

In the operation of the densitometer shown in FIG. 7, ambient noise will cause detector 30 to pick up signals in a band of frequencies including the resonant frequency of the electromagnetic oscillator. That is, signals will be amplified by amplifier 61, converted from a current to a voltage by converter 76, and differentiated by differentiator 82. The output of differentiator 82 will thus be a sine wave which is converted into a square wave by squarer 83. Amplitude control 90 may be used to reduce the output of squarer 83 to a limiting value. The frequency location of the passband of tracking filter 91 will then be varied by filter frequency control 94 to follow or pass the fundamental frequency of the output of control 90 to power amplifier 92 through squarer 200 with a minimum attenuation. The frequency location of the passband of tracking filter 91 thus will be controlled through varying the resistance of transistor 106, shown in FIG. 10. This will be done in accordance with the difference between the phases of the output signals of control 90 and squarer 200 by phase comparator 93. Power amplifier 92 will then drive coil 24 with a signal (1) synchronous with the resonant frequency output signal of detector 30, but of a frequency equal to (2) one-half the resonant frequency. This is true because the magnetostrictive driver goes through one complete oscillation for each half cycle of the driving voltage when there is no D.C. bias, and divider 201 compensates for this factor.

The vibration produced by coil 24 will then increase in amplitude until limited by amplitude control 90. At this time, the amplitude of the vibration will reach an approximately quiescent level. Should fluid be flowing in pipeline 19, and should the density of the fluid change, the frequency of the output signal of tracking filter 91 will also change. Linearization circuit 109 will then produce a D.C. output voltage directly proportional to density. Indicator or voltmeter 110 may then be read, when calibrated in density.

Note will be taken that parts of the probe 10 are vibrated because the alternating signal applied to coil 24, as shown in FIG. 2, will place varying amounts of radial compression on half cylinder 26, inner tube 21 expanding and contracting axially between shank 40 and the abutment of inner tube 21 at its lower end with its half cylinder 26.

It is an advantage of the device of the present invention that differentiator amplifier 61 and converter 76 is used. For example, converter 76 may be located a great distance from probe 10. Converter 76 has a low resistance input and is thus a ground input device. The accuracy by which the resonant frequency signal output of detector 30 is transmitted to converter 76 is not affected by longitudinal transmission line between probe 10 and converter 76. That is, the ground magnitude is accurate regardless of the length of line. The voltage drop along the line, therefore, does not affect the accuracy when the resonant frequency signal is transmitted to converter 76 from differentiator amplifier 61. The rejection of external noise is also to be limited.

It is a feature of the invention that the interference fit of sleeve 22 on half cylinders 26 and 27 is employed to improve efficiency and accuracy. The use of crystal 30 also makes it possible to employ a vibrating structure which is very small. The continuous compression fit of projection 39 between shank 43 and the upper side of half cylinder 26, as shown in FIG. 2, also improves vibration efficiency. The operation of the leads from crystal 30 from the leads from coil 24 is also a substantial advantage. The current through coil 24 thus cannot induce a feedback current in the crystal leads. Note that the crystal leads and the coil leads are entirely separated and notice that they extend above the top of shield 53 in FIG. 2. As stated previously, shield 53 is magnetic. So is fitting 50; so is washer 52; so is inner tube 21. The crystal leads are thus completely enclosed in a magnetic shield until they reach amplifier 61. Note, too, that shield 53 seals everything inside thereof from coil leads 57 and 58 until they reach the top of shield 53. The output of amplifier 61, the induction from amplifier 61 has raised the level of the input signal thereto to a substantial value. No substantial unwanted induction thus takes place between the coil leads and the output leads of amplifier leads 61 above the top of shield 53 which, as stated previously, is made of magnetic material.

It is also an advantage of the invention that O-rings 46 and 47 resiliently mount probe shank 11 through fitting 17. Substantially improved efficiency and accuracy are to be achieved. The same is true of the resilient mount of electrical connector 14 through O-rings 70 and 72.

One outstanding advantage of the present invention resides in the use of differentiator 82 with tracking filter 91. Differentiator 82 acts, more or less, as a high pass filter. If the amplitude of output signals of differentiator 82 are plotted as a function of frequency, this amplitude would be substantially a straight line of a predetermined positive slope, amplitude being indicated positive vertically upward on the ordinant, and frequency being indicated positive to the right. In spite of the fact that differentiator 82 acts as a very good high pass filter, it provides a constant 90° phase shift of input signals thereto. Tracking filter 91 conveniently also provides such a phase shift at the frequency at which signals are attenuated the least. Differentiator 82 and tracking filter 91 provide a phase shift in the same direction, i.e., lead or lag. This means that the output of power amplifier 92 is an alternating signal which may be adjusted in phase, i.e., 180° or zero, simply by reversing the leads 57 and 58 from driver coil 24 connected therefrom. An in-phase drive is to be effected.

Another feature of the invention uses the double integration system to derive the function $$A/f^2 + B$$

An outstanding advantage of the invention resides in the use of switches 117, 118, 119 and 120 with circuit 112 to prevent any frequency modulation of the input to integrator 133 from destroying the accuracy of the output of circuit 136.

The function of the double integration is easily understood when it is considered that the integral of E, a constant, with respect to X, results in EX, and the integral of EX results in $EX^2/2$.

Note will be taken that an outstanding feature of the invention resides in the use of probe 10. Probe 10 may be used with any pipe size and has substantial sensitivity and accuracy. No pressure differentiators or changes are involved. The densitometer of the present invention may have an accuracy tolerance of ±0.01 percent over a range of, for example, 0.08 pounds per cubic foot to 80.0 pounds per cubic foot. Vane 20 is small and compact and does not disturb the flow of pipeline 19. The same is true of other structures surrounding vane 20.

Note at the bottom of FIG. 2, projection 39, outer tube 23, boss 36, and inner tube 21 form a completely closed magnetic circuit about driver coil 24 for maximum driving accuracy. Note, too, that inner tube 21 is nowhere cemented or phased by bonding or the like to outer tube 23, inner tube 21 only being fixed in outer tube 23 magnetically. The same is true of the bottom inner tube 21, and boss 36 and sleeve 22. That is, inner tube 21 is not bonded or otherwise similarly fixed to boss 36 or sleeve 22, but is only, more or less, slidable therethrough. What is meant by "not fixed" in the immediately preceding description is that, further, there is no press fit. Similarly, the inner end of inner tube 21 is not fixed to half cylinder 26.

What is claimed is:

1. A vibration densitometer comprising: a base; a structure mounted on said base in a position to be vibrated; a piezoelectric crystal fixed relative to and contiguous to said structure to produce an output signal of a frequency equal to resonant frequency of said structure; a magnetostrictive driver mounted on said base in a position such that, when energized, it can cause said structure to vibrate; and first and second means connected in succession in that order from said crystal to said driver, at least one of said means including an amplifier, said structure, said crystal, said first and second means and said driver forming a closed loop electromechanical oscillator, said amplifier having a gain adequate to sustain vibration of said structure continuously, one of said means including a divide-by-two divider; and utilization means connected from the output of said first means.

2. The invention as defined in claim 1, wherein said first means includes a differential amplifier, a current-to-voltage converter, a differentiator, a first squarer, an amplitude control, a tracking filter and a second squarer connected in succession from said crystal to said second means, a phase comparator connected from the outputs of said amplitude control and said second squarer, a filter frequency control connected from the output of said comparator to the control input of said filter, said second means including a power amplifier connected to said driver, said second means including said divide-by-two divider connected from said second squarer to said power amplifier, said utilization circuit and an indicator connected in succession from the output of said second squarer.

* * * * *